United States Patent
Casali

(10) Patent No.: US 12,240,335 B2
(45) Date of Patent: Mar. 4, 2025

(54) GREASING SLEEVE

(71) Applicant: FURRER + FREY AG, Bern (CH)

(72) Inventor: Bruno Casali, Toffen (CH)

(73) Assignee: FURRER + FREY AG, Bern (CN)

( * ) Notice: Subject to any disclaimer, the term of this patent is extended or adjusted under 35 U.S.C. 154(b) by 762 days.

(21) Appl. No.: 17/434,322

(22) PCT Filed: Feb. 21, 2020

(86) PCT No.: PCT/IB2020/051459
§ 371 (c)(1),
(2) Date: Aug. 26, 2021

(87) PCT Pub. No.: WO2020/174332
PCT Pub. Date: Sep. 3, 2020

(65) Prior Publication Data
US 2022/0144099 A1    May 12, 2022

(30) Foreign Application Priority Data

Feb. 27, 2019 (EP) ..................................... 19020094

(51) Int. Cl.
*B60L 5/24* (2006.01)
*B60M 1/28* (2006.01)
*B60M 1/30* (2006.01)

(52) U.S. Cl.
CPC .................. *B60L 5/24* (2013.01); *B60M 1/28* (2013.01); *B60M 1/30* (2013.01); *B60L 2200/26* (2013.01);
(Continued)

(58) Field of Classification Search
CPC ......... B60L 5/24; B60M 1/28; B60Y 2306/03
(Continued)

(56) References Cited

U.S. PATENT DOCUMENTS 3,349,197 A * 10/1967 Scheidecker ............. B60L 5/24
  191/67
5,124,510 A *  6/1992 Garfinkle .................. B60L 5/19
  191/65
(Continued)

FOREIGN PATENT DOCUMENTS

DE   102012021358 A1   5/2014
DE   102013225482 A1   6/2015
EP       0593350 A1   4/1994

OTHER PUBLICATIONS

International Search Report of PCT/IB2020/051459.
(Continued)

*Primary Examiner* — Henry Y Liu

(57) ABSTRACT

The invention concerns a method for greasing a contact wire for the electrical power supply of a pantograph of a rail vehicle comprising:
  inserting the contact wire into a passage opening of a base body extending in a longitudinal direction, a transverse direction perpendicular to the longitudinal direction and a height direction perpendicular to the longitudinal direction and perpendicular to the transverse direction, whereby the passage opening penetrating the base body in the longitudinal direction as seen from a front side to a back side as seen in the longitudinal direction, and
  accelerating the base body in the longitudinal direction so that the contact wire is moved through the passage direction, characterized by
  introducing grease into the passage opening through which the contact wire moves at a feed rate at which the introduced grease exits the passage opening at the back of the base body under a predetermined condition.

13 Claims, 6 Drawing Sheets

(52) U.S. Cl.
CPC ....... *B60Y 2200/30* (2013.01); *B60Y 2306/03* (2013.01)

(58) Field of Classification Search
USPC .......................................................... 184/14
See application file for complete search history.

(56) References Cited

U.S. PATENT DOCUMENTS

| | | | | |
|---|---|---|---|---|
| 5,156,756 | A * | 10/1992 | Kojima | C10M 105/08 |
| | | | | 508/178 |
| 5,385,411 | A * | 1/1995 | Shirai | G01P 3/443 |
| | | | | 384/446 |
| 9,061,594 | B2 * | 6/2015 | Wesche | G06T 7/0004 |
| 9,266,436 | B2 * | 2/2016 | Nitti | B60L 5/02 |
| 9,393,874 | B2 * | 7/2016 | Nakajima | B60L 5/24 |
| 9,643,495 | B2 * | 5/2017 | Kanazawa | B60L 5/26 |
| 11,044,838 | B2 * | 6/2021 | Suzuki | B60M 1/13 |
| 2010/0322465 | A1 * | 12/2010 | Wesche | B60M 1/28 |
| | | | | 348/125 |
| 2011/0094731 | A1 * | 4/2011 | Crawford | E21B 33/08 |
| | | | | 166/84.2 |
| 2014/0202817 | A1 * | 7/2014 | Nitti | B60L 5/02 |
| | | | | 191/59.1 |
| 2015/0034441 | A1 * | 2/2015 | Nakajima | B60L 50/13 |
| | | | | 191/59.1 |
| 2015/0136555 | A1 * | 5/2015 | Kanazawa | B60L 9/00 |
| | | | | 191/59.1 |
| 2017/0001657 | A1 * | 1/2017 | Yamada | B62D 1/187 |
| 2019/0297750 | A1 * | 9/2019 | Suzuki | H05K 7/20945 |
| 2020/0369155 | A1 * | 11/2020 | Lindqvist | B61L 25/025 |

OTHER PUBLICATIONS

Written Opinion of PCT/IB2020/051459.
Furrer+Frey, Overhead Conductor Rail Systems, https://www.furrerfrey.ch/dam/jcr:b88ba091-69c5-483d-93b9-ec4fca4b389e/F+F_DSS_EN_low.pdf, Jan. 1, 2012, 32Pages.
B. Furrer, Overhead Conductor Rail for North-South Long Distance Railway Tunnel in Berlin, Apr. 1, 2003, vol. 101, No. 4/05, Deutscher Industrieverlag.

* cited by examiner

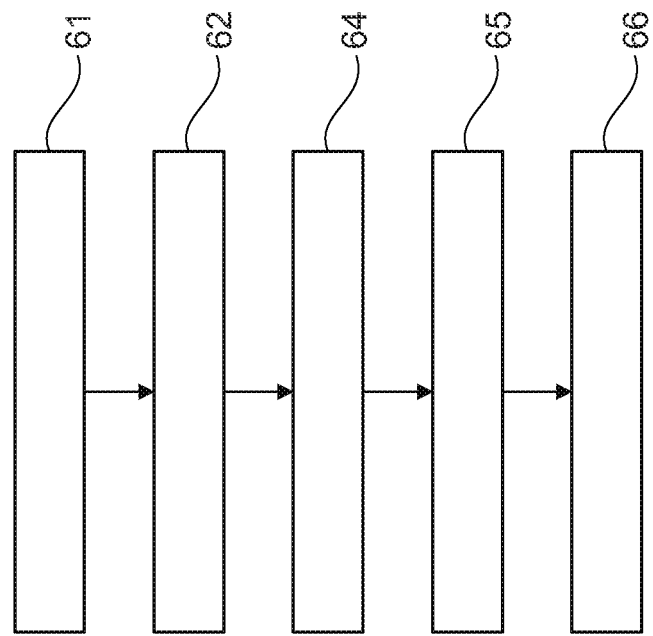
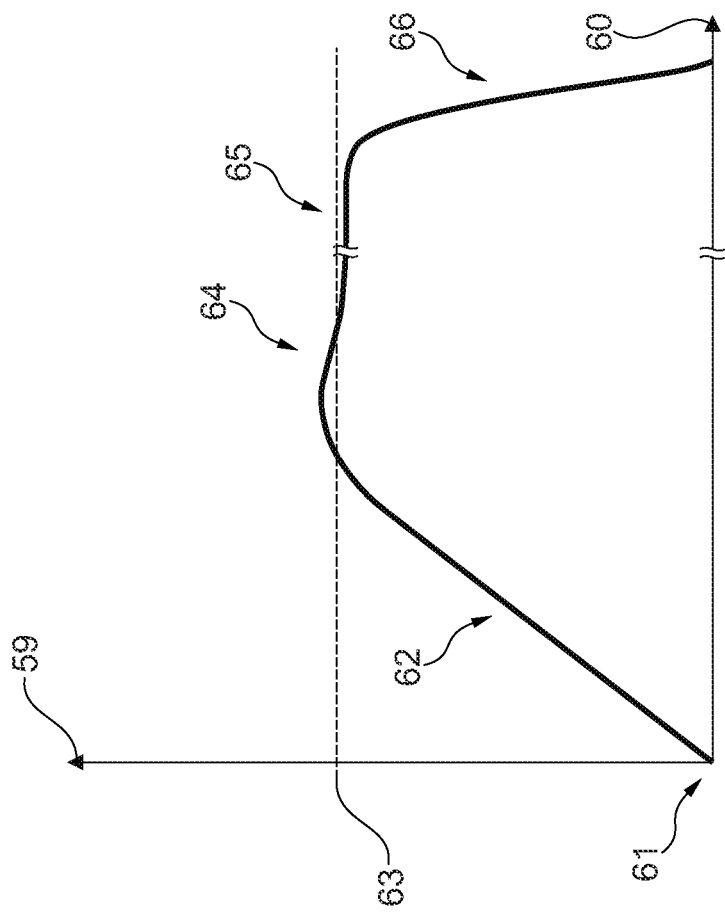
Fig. 6
Fig. 7

GREASING SLEEVE

CROSS-REFERENCE TO RELATED PATENT APPLICATIONS

This Application is a national stage application of PCT/IB2020/051459. This application claims priorities from PCT Application No. PCT/IB2020/051459, filed Feb. 21, 2020, and from the European patent application 19020094.9 filed Feb. 27, 2019, the content of which are incorporated herein in the entirety by reference.

TECHNICAL FIELD

The present invention concerns a method for greasing a contact wire for the electrical power supply of a pantograph of a rail vehicle and a greasing device for use in the procedure. A method for greasing a contact wire for the electrical power supply of a pantograph of a rail vehicle and a greasing device for use in the procedure are known from ES 2 409 085 A2.

SUMMARY

The object of the invention is to improve the known method and the known greasing device.

The task is fulfilled by the characteristics of the independent claims. Preferred embodiments are the subject matter of the dependent claims.

According to one aspect of the invention, a method for greasing a contact wire for the electrical power supply of a pantograph of a rail vehicle comprises the steps of inserting the contact wire into a passage opening of a base body extending in a longitudinal direction, a transverse direction perpendicular to the longitudinal direction and a height direction perpendicular to the longitudinal direction and perpendicular to the transverse direction, whereby the passage opening penetrating the base body in the longitudinal direction as seen from a front side to a back side as seen in the longitudinal direction, accelerating the base body in the longitudinal direction so that the contact wire is moved through the passage direction and introducing grease into the passage opening through which the contact wire moves at a feed rate at which the introduced grease exits the passage opening at the back of the base body under a predetermined condition.

The method described is based on the consideration that the grease should be applied to the contact wire with a predetermined structure, in particular with regard to its coating thickness, in order to ensure effective protection. In the method mentioned at the outset, however, the grease is applied by brushes, which basically allows the grease to be applied to the contact wire, but not evenly, because the brushes spread the grease with streaks on the contact wire, so that the coating thickness of the applied grease varies, and in some places is even hardly present.

In this case, the method indicated is based on the consideration that the passage opening for the grease to be applied is a reservoir which, after it has run full, dispenses the grease to be applied at the same speed as it is supplied. In this condition, it can be assumed that the passage opening is completely filled with grease so that the contact wire drawn through the passage opening is evenly coated with grease. In contrast to the method indicated above, a grease layer with a constant coating thickness is therefore achieved which protects the contact wire completely.

In a further embodiment of the mentioned method, the grease exiting at the back of the base body from the passage opening is free of movement components at an angle to the longitudinal direction under the predetermined condition. In this way, it is ensured that the grease to be applied is introduced into the passage opening at exactly the speed and quantity required for the application to the contact wire.

In a special further embodiment of the mentioned method, the feed rate is increased as a function of the acceleration of the body in the longitudinal direction, so that changes in speed are taken into account when the grease is fed, thus avoiding unintentional waste of grease.

In another further embodiment of the mentioned method, before introducing grease into the passage opening, a tapered element which narrows the cross-section of the passage opening is inserted into the passage opening between a point of introduction and the back of the base body. This tapered element serves as a nozzle not only to build up an appropriate pressure for optimum grease application in the passage opening, it is also used to control the coating thickness of the grease to be applied.

In another further embodiment of the mentioned method, the grease to be introduced into the passage opening is passed through a fitting which is actuated to reduce the feed rate. Operation can be done manually by operator or electronically as part of a control and/or regulation system.

In accordance with a further aspect of the invention, a greasing device for use in one of the indicated methods comprises the base body with the passage opening through which the contact wire can be pushed in the longitudinal direction and the supply line leading into the passage opening, and a fitting for adjusting the supply rate arranged in front of the supply line when viewed from the passage opening.

In another embodiment of the indicated greasing device, the fitting is a shut-off valve which, as a valve key, preferably comprises a lever with a length of at least 5 cm which rotates about an axis of rotation. In this way, the feed rate can be adjusted very sensitively by the operator to the predetermined condition mentioned at the beginning.

BRIEF DESCRIPTION OF THE DRAWINGS

The above-described properties, features and advantages of this invention, as well as the manner in which they are achieved, will become clearer in connection with the following description of the embodiments, which are described in more detail in connection with the drawing, in which:

FIG. 6 is a diagram representing a feed rate of grease into the greasing sleeve of FIGS. 2 and 3 over time, and FIG. 7 is a process diagram of a method for the use of the greasing sleeve of FIGS. 2 and 3.

DETAILED DESCRIPTION

Figure 1:
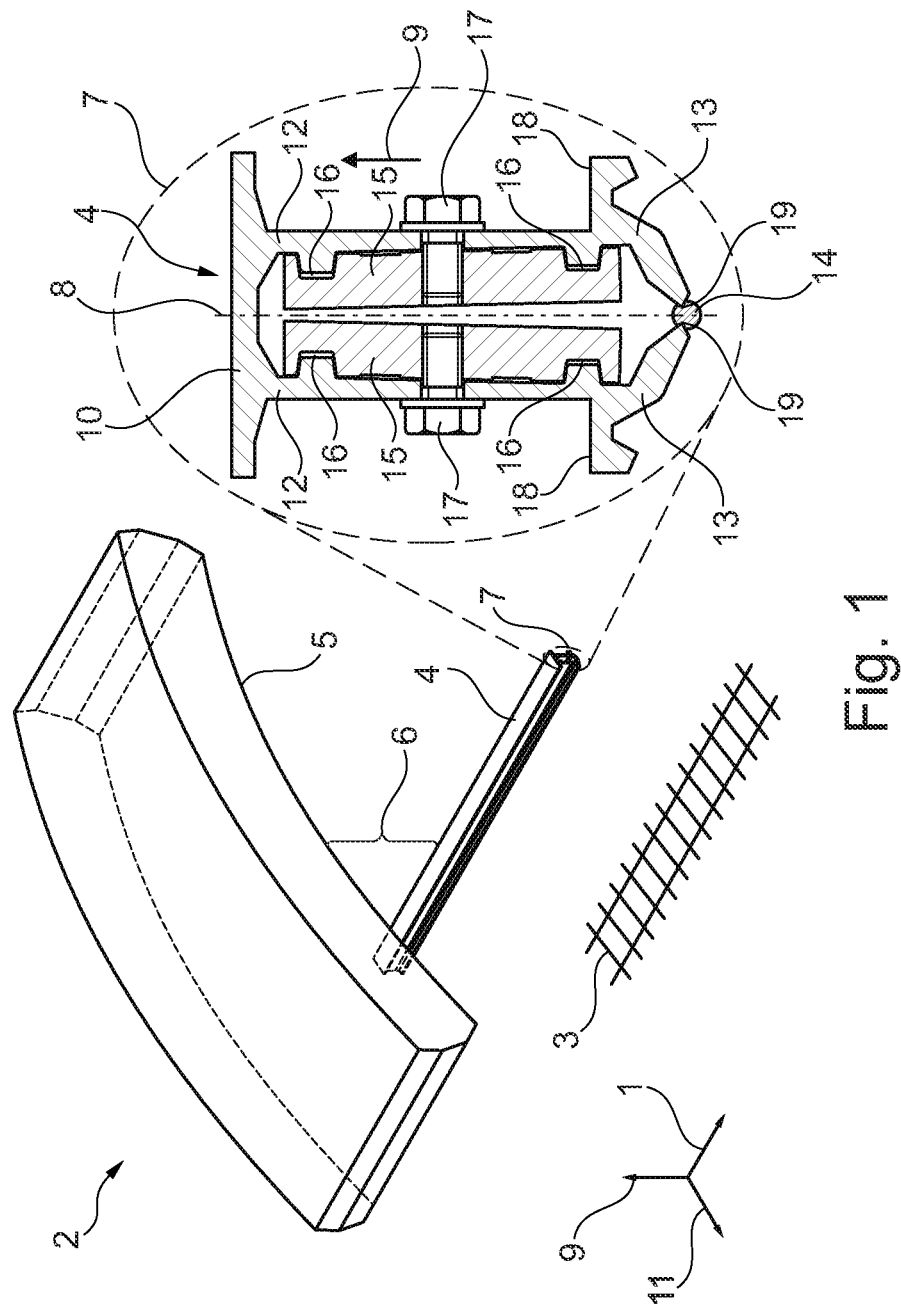
FIG. 1 is a schematic representation of a driving path with a conductor rail in which a conductor rail is held.

In the drawings, the same technical elements are provided with the same reference signs, and are only described once.

The drawings are purely schematic and, in particular, do not reflect the actual geometric proportions. Reference is made to FIG. 1 showing a track section 2 with a track 3 extending in a direction of travel 1 or longitudinal direction 1 with a track 3, on which a train not shown here can move electrically driven on track 3. For the electrical power supply of the train, a conductor rail 4 is arranged at a not further referenced height above track 3, also extending in the longitudinal direction 1, from which the train with a not further referenced pantograph can draw electrical current in a manner known per se.

The conductor rail 4 is suspended from a carrier, which is shown in FIG. 1 in the form of a ceiling 5 as an example. Ceiling 5 could, for example, be part of a tunnel or a bridge. The conductor rail 4 can be held at a suspension distance 6 from the ceiling 5 by means of suspension means which are not shown in any further detail.

FIG. 1 shows an enlargement of the profile 7 of the conductor rail 4.

When viewed in profile 7, the conductor rail 4 is axisymmetrical to a profile axis 8. The profile axis 8 runs parallel to a height direction 9 of track section 2. Viewed in height direction 9, there is a transverse arm 10 on the upper side of the conductor rail 4, of which two tension arms 12 extend at a distance from each other in a transverse direction 11 running at a right angle to the longitudinal direction 1, and at a right angle to the height direction 9, against the height direction 9. A clamping arm 13 is connected to the end of each tension arm 12 opposite the transverse arm 10, between which a contact wire 14 is held clamped by the tension arms 12.

The conductor rail 4 shown in FIG. 1 is usually made up of a large number of conductor rail sections which, as seen in profile 7 of FIG. 1, are laid against each other at the front end exactly aligned with each other via fishplates 15. The mutual alignment takes place via an engagement in height direction 9 between the fishplates 15 and the conductor rail sections, which is designed in FIG. 1 as a tongue and groove connection 16. To fix the individual conductor rail sections against each other, screws 17 can be screwed into the fishplates 15.

In order to clamp the contact wire 14 between the clamping arms 13, track sections 18 extending at a connection point between the clamping arms 13 and the tension arms 12, in or against the transverse direction 11 are connected, on which a threading carriage not shown in more detail can move.

If water accumulates at the resulting clamping points 19, redox reactions cause local elements to form. Due to the choice of materials in commercially available conductor rails, the distance between the metals at the clamping points 19 in the electrochemical series is sufficiently large to cause weathering damage when water accumulates there. Various approaches have already been proposed to reduce water accumulation in order to avoid the formation of local elements, for example according to WO 2014/067989 A1 with drainage openings. However, the occurrence of water can never be completely avoided, which is why it makes more sense to actively protect clamping points 19 from water.

Figure 2:
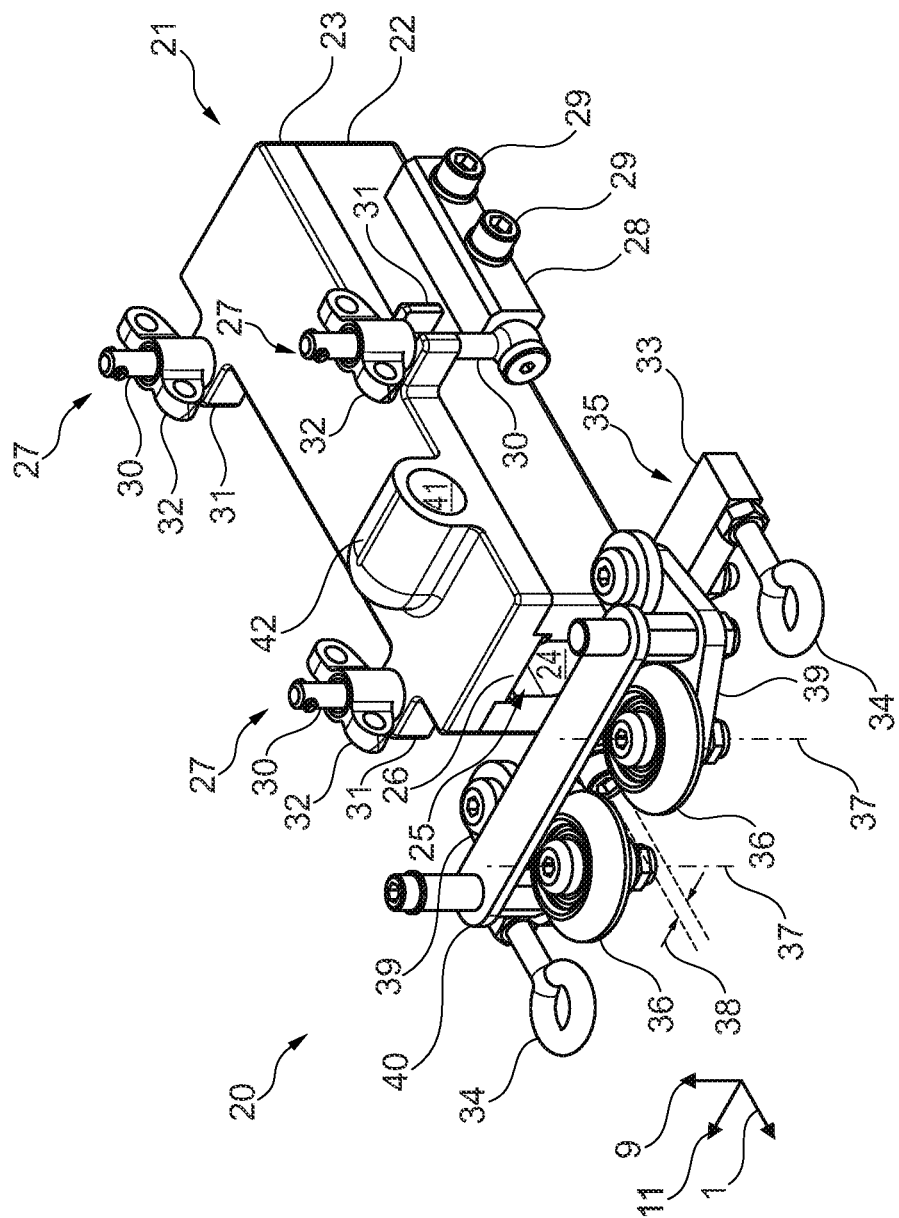
FIG. 2 is a schematic representation of a greasing sleeve for greasing the contact wire from FIG. 1 from a first perspective.
Figure 3:
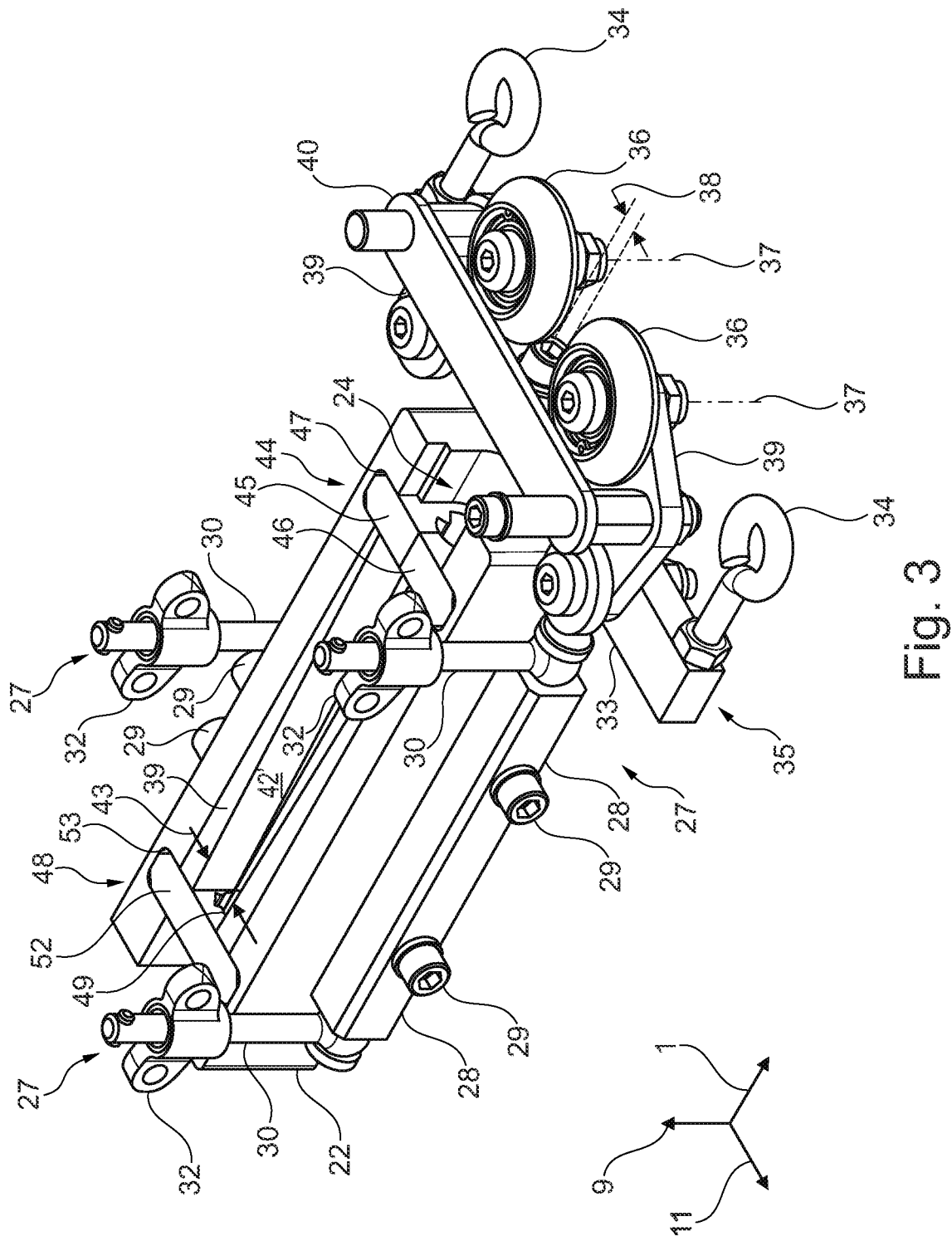
FIG. 3 is a schematic representation of the greasing sleeve from FIG. 2 from a second perspective.

For this purpose, a greasing device 20, also called a greasing sleeve, shown in FIGS. 2 and 3, is proposed, which coats the contact wire 14 with grease in the area of the clamping points 19 immediately before being clamped by the threading carriage in the conductor rail 4, so that after the clamping of the contact wire 14 in the conductor rail 4 no water can approach the clamping points 19 which bridges the conductor rail 4 and the contact wire 14 and thus forms local elements. Before the use of the greasing device 20 is described in detail, its structure should first be explained.

The greasing device 20 comprises a base body 21 comprising, among other things, a guide body part 22 and a cover part 23.

A groove 24 extending in the longitudinal direction 1 is formed on an upper side of the guide body part 22 seen in the height direction 9. The groove 24 is open in the longitudinal direction 1 at the face sides of the guide body part 22 which are not referenced further, so that the contact wire 14 can be inserted into the groove 24.

The cover part 23 is placed on the upper side of the guide body part 22, seen in the height direction 9, so that the groove 24 is closed and forms a passage opening 25 through the base body 21. For precise positioning of cover part 23 on the guide body part 22, a positioning projection 26 can be formed on the cover part 23 in the area of each of the unreferenced face sides of the base body 21 in longitudinal direction 1. These positioning projections 26 engage positively in the groove 24 when the cover part 23 is placed on the guide body part 22 in transverse direction 11. The cover part 23, which is placed on the guide body part 22, is then fastened to the guide body part 22 by means of three screw connections 27. One screw connection 27 is arranged on the back side of the base body 21 when viewed in the transverse direction 11, while two screw connections 27 are arranged on the front side.

Each screw connection 27 comprises a fixing strip 28 extending in the longitudinal direction 1, wherein the fixing strips 28 of the screw connections 27 are formed integrally on the front side of the base body 21 when viewed in the transverse direction 11. The fixing strips 28 are fastened to the guide body part 22 by means of screws 29. A threaded rod 30, which can be swivelled around the longitudinal direction 1, is attached to one face side of each fixing strip 28, when viewed in the longitudinal direction 1, and can be swivelled into one fork element 31 each on the cover part 23. In the state in which the threaded rods 30 are swivelled into the fork elements 31, one wing nut 32 each is screwed onto the respective fork element 31 towards the respective fixing strip 28, so that the cover part 23 is pressed onto the guide body part 22, which produces the aforementioned frictional connection. In order to avoid a loss of the wing nuts 32 when the greasing device 20 is in the dismantled state, the upper end of the threaded rods 30 seen in height direction 9 may be equipped with movement limitation means, which are not referenced further for the sake of clarity.

To pull the greasing device 20, it has a horizontal beam 33, also known as a draw bar, on the front end of the base body 21 when viewed in the longitudinal direction 1, aligned in the transverse direction 11. At the ends of the horizontal beam 33 when viewed in the transverse direction 11, there are holding elements in the form of eye bolts 34 aligned in the longitudinal direction 1. The horizontal beam 33 and the eye bolts 34 together form a connecting element 35, via which the greasing device 20 can be connected to a pulling mechanism and pulled over the contact wire 14 in the longitudinal direction 1. This pulling mechanism will be discussed later in connection with FIGS. 4 and 5.

On the horizontal beam 33, between the two eye bolts 34, two guide pulleys 36 are held rotatably about one rotation axis 37 each, which are aligned in the height direction 9. In addition, the guide pulleys 36 are arranged in transverse direction 11 at a roller distance 38 from each other. The guide pulleys 36, when viewed from an underside of the base body 21 seen in the height direction 9, are arranged at a not further referenced height, which is equal to a likewise not further referenced height of the passage opening 25, so that the contact wire 14, when pulling the greasing device 20 in a curve of the track 3, can be guided over the guide pulleys 36 in a predetermined rotational position about the longitudinal direction 1 into the passage opening 25. The guide pulleys 36 are each held on a swivel arm 39 so that the position of the guide pulleys 36 can be adapted to the transverse movements of the contact wire 14 in the transverse direction 11. In order to keep the roller distance 38 constant, the swivel arms 39 are connected to each other via a coupling rod 40.

The grease to be applied to the contact wire is fed into the passage opening 25 of the greasing device 20 via a supply line 41. The supply line 41 leads through a connection socket 42 which is arranged on an upper side of the cover part 23 when viewed in the height direction 9. A supply line can be connected to the connection socket 42, which feeds the grease from a source not shown in further detail into the supply line 41. A tap is arranged between the source and the connection socket 42 to control the supplied quantity of grease. Both the supply line and the tap are described in more detail in connection with FIGS. 4 and 5.

In practice, the contact wire 14 is very long, and is immediately clamped in the conductor rail 4 during installation on the track section 2 after greasing via the threading carriage. It is therefore difficult, when viewed in the longitudinal direction 1, to thread the contact wire into the passage opening 25 on the face side. The mounting of the greasing device 20 to the contact wire 14 is therefore implemented in the present version in a more practical way. In addition, the greasing device 20 has further elements which enable a particularly effective application of grease to the contact wire 14 in the application to be described later.

The passage opening 25 has a funnel-shaped area 42' in which an opening width 43 of the passage opening 25 tapers in the transverse direction 11 against the longitudinal direction 1. This tapering takes place in at least one section of the funnel-shaped area 42', which is connected to the point where the supply line 41 leads into the passage opening 25. This funnel-shaped area 42 represents a nozzle which fills the passage opening 25 with grease before it can leave the passage opening 25 at the back side when viewed in longitudinal direction 1. In this way, a homogeneous grease application is achieved.

The funnel-shaped area 42 is designed as an insert that can be inserted into the groove 24 so that the funnel-shaped area 42 and thus the aforementioned nozzle effect can be adapted to contact wires 14 of different conductor cross-sections. In this way, the funnel-shaped area 42 can be easily adapted by replacing the insert.

When viewed in the longitudinal direction 1 in front of the funnel-shaped area 42', a guiding sleeve 44 is arranged in the passage opening 25. The guiding sleeve 44 has an unreferenced passageway in which the contact wire 14 can be held positively in the height direction 9 and the transverse direction 11. In this way, the guiding sleeve 44 corrects the positioning of the contact wire 14 when entering the funnel-shaped area 42' in a certain angular position around the longitudinal direction 1 and in the transverse direction 11, so that the pressure of the grease is applied evenly to both sides when viewed in the transverse direction 11. The above mentioned guide pulleys 36 thus roughly pre-position the contact wire 14, while the guiding sleeve 44 carries out a fine positioning and inserts the contact wire 14 exactly in the middle as well as in a firmly defined rotary position into the funnel-shaped area 42'.

For easy installation on the contact wire 14, the guiding sleeve 44 is made up of a first guiding sleeve half 45 and a second guiding sleeve half 46, which can be assembled to the guiding sleeve 44 by joining in or against the transverse direction 11. The assembled guiding sleeve 44 is held in a guiding sleeve rail 47 in the guide body part 22.

During operation, the contact wire 14 is inserted into one of the guiding sleeve halves 45, 46 and the guiding sleeve 44 is closed by placing the corresponding other guiding sleeve half 46, 45 in or against the transverse direction 11. The assembled guiding sleeve 44 can now be inserted into the guiding sleeve rail 47.

When viewed in the longitudinal direction 1, a wiper sleeve 48 is arranged on the side of the funnel-shaped area 42 opposite the guiding sleeve 44. The wiper sleeve 48 has a passage similar to the guiding sleeve 44, in which, however, a nose 49 aligned against the height direction 9 is arranged on the upper side when viewed in the height direction 9, which presses on an upper side of the contact wire 14 when viewed in the height direction 9. When viewed in the transverse direction 11 to the left and right of nose 49, cavities are formed through which grease can pass the wiper sleeve 48 and be applied to the contact wire 14. A nose width 50 of the nose 49 when viewed in transverse direction 11 is selected in such a way that the cavities are located at the points of the contact wire 14 where the clamping points 19 are provided when being clamped in the conductor rail 4.

Figure 4:
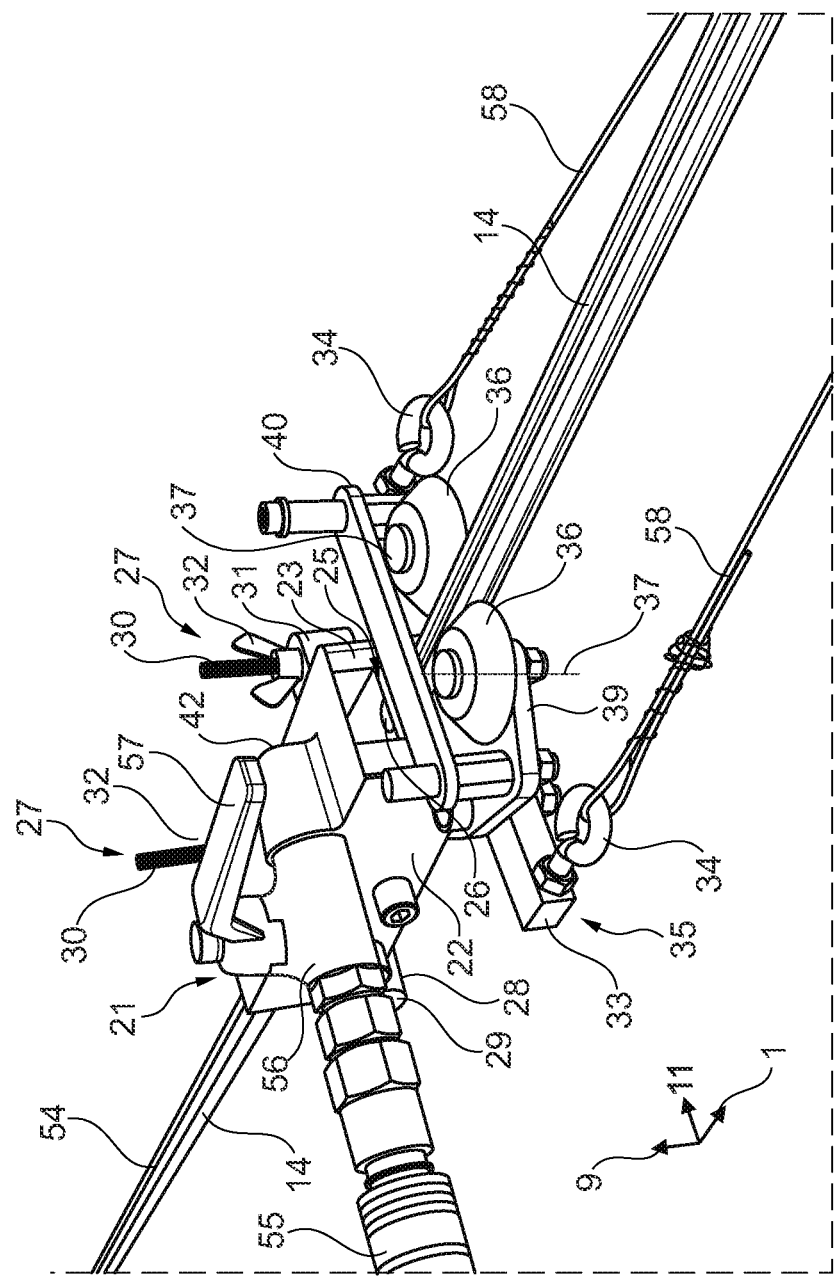
FIG. 4 is a schematic representation of the greasing sleeve from FIGS. 2 and 3 in use.

The wiper sleeve 48 is composed of a lower wiper sleeve half 51 and an upper wiper sleeve half 52, which can be assembled by joining in or against the height direction 9. To mount the greasing device 20, the lower wiper sleeve half 51 is inserted into a corresponding wiper sleeve rail 53 in the guide body part 22, and the insert forming the funnel-shaped area 42' is inserted into the groove 24. Then the contact wire 14, around which the guiding sleeve 44 is placed in the manner described above, is inserted into the lower wiper sleeve half 51 and the funnel-shaped area 42', the guiding sleeve 44 being inserted into the guiding sleeve rail 47 in the manner described above. Now the upper wiper sleeve half 52 is inserted into the wiper sleeve rail 53 so that the wiper sleeve 48 is assembled. The greasing device 20 in this mounting condition is shown in FIG. 4. Finally, the cover part 23 is placed on the guide body part 22 in the above manner and screwed tight. Now the grease can be introduced into the passage opening 25 via the supply line 41 in the area of the funnel-shaped area 42' and the grease can be applied to the contact wire 14 in the way already described.

In order to avoid an application of grease at the contact point of the pantograph of the contact wire 14 as far as possible, the passage opening 25 is adapted to a shape of the contact wire 14 on the bottom side when viewed in the height direction 9. In this way, the contact wire 14 engages with the bottom side of the passage opening 25 in the height direction 9 and in the transverse direction 11 so that no grease can reach this point. The nose 49 presses the contact wire 14 against the bottom side and thus keeps the contact wire 14 free of grease at the contact point to the pantograph. This ensures that the grease is actually only applied to the contact wire 14 in the area of the clamping points 19 and nowhere else.

Figure 5:
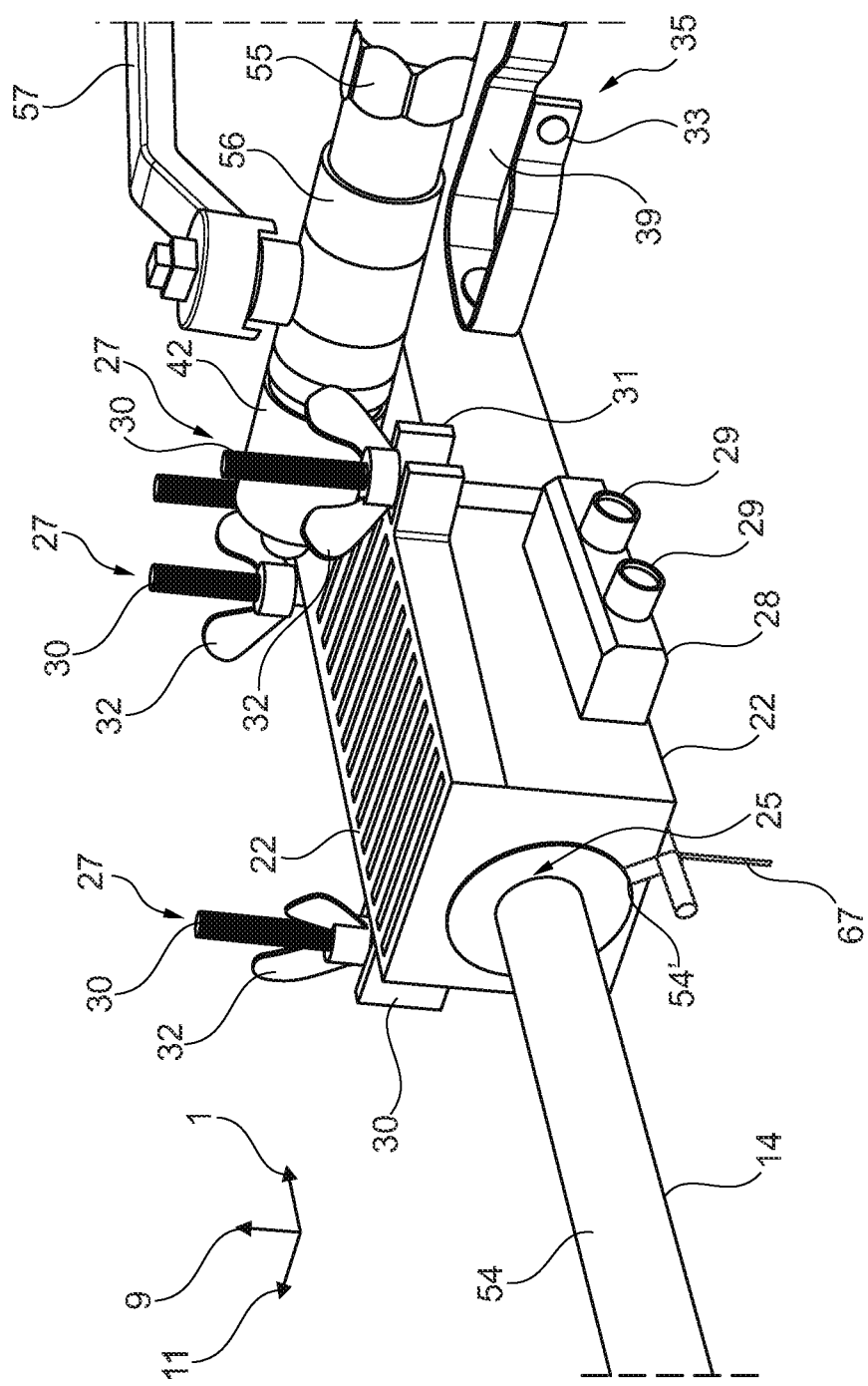
FIG. 5 is another schematic representation of the greasing sleeve from FIGS. 2 and 3 in use.

In the following, FIGS. 4 and 5 are used to describe the greasing application in more detail, showing the greasing device 20 with a contact wire 14 inserted into the passage opening 25 in the manner described above.

FIGS. 4 and 5 show the grease which is applied to the contact wire 14 by means of the greasing device 20. It has the reference sign 54.

The grease 54 is supplied via the supply line mentioned above. In the FIGS. 4 and 5, the supply line has the reference sign 55. After the contact wire 14 has been inserted into the greasing device 20, the supply line 55 is connected to connection socket 42 via a fitting, here in the form of a shut-off valve designed as a tap 56. The task of the tap 56 is to set a pipe cross section between supply line 55 and connection socket 42 in order to influence the amount of grease per unit time from supply line 55 into passage opening 25 and thus the rate at which grease is supplied into passage opening 25. The pipe cross section can be adjusted at tap 56 by means of a valve key in the form of a lever 57, which is mounted so that it can rotate about an axis of rotation that is not shown in further detail. The lever should be at least 5 cm long so that it can be used with sufficient sensitivity.

In addition to connecting the greasing device 20 to the supply line 55, the eye bolts 34 are also connected to the above-mentioned pulling device. FIG. 4 shows only the pull ropes 58 of this puling device. It may be useful for the pulling device to be a car moving along the longitudinal direction 1 in which the operator is standing. The eye bolts 34 of the greasing device 20 can then be connected to the car via the pull ropes 58.

If the contact wire 14 for greasing is inserted into the greasing device 20 in the manner described above before installation in the conductor rail 4, the supply line 55 is connected to the connection socket 42 and the greasing device 20 is connected to the contact wire via the pull ropes 58, then the car is set in motion in the longitudinal direction 1, for example carried on a rail vehicle moving on track 3, whereby the greasing device 20 is pulled along. The operator in the car now turns the lever 57 continuously, so that the above-mentioned pipe cross section between the feed line 55 and the passage opening 25 opens further and further, and the feed rate of grease 54 into the passage opening 25 increases accordingly. In this way the grease 54 is applied to the contact wire 14 in the manner shown in FIG. 5 leaving the greasing device 20 at the back when viewed in longitudinal direction 1.

If the operator turns the lever 57 too far so that the grease 54 on the back side of the greasing device 20 is not only applied to the contact wire 14 but begins to run down at the back and drip down with drops 67, the operator knows that the feed rate is too high to apply the entire grease 54 from the feed line 55 to the contact wire 14. At that point, the operator stops unscrewing the lever 57.

If necessary, the operator turns the lever 57 slightly to close it again until the grease 54 stops forming drops 67 and dripping down at the back of the greasing device 20.

In conclusion, we summarize the procedure for applying grease 54 to the contact wire 14 once again using FIGS. 5 and 6. FIG. 5 shows a diagram in which the above-mentioned feed rate of grease 54 is provided with the reference sign 59 and plotted over time 60, while FIG. 6 shows a flow chart of the individual steps to be performed.

First, in a preparation step 61, the contact wire 14 is inserted into the greasing device 20, the supply line 55 is connected to the connection socket 42 via the tap 56, and the greasing device 20 is connected to the car via the pull ropes 58. In the diagram of FIG. 5, this step takes place at the very beginning.

Then, in opening step 62, the car is accelerated and at the same time the lever 57 for opening the feed line 55 is turned towards the passage opening 25, so that the grease 54 is introduced into the passage opening with an increasing feed rate 59.

The opening step 62 is performed until the feed rate 59 exceeds a limit feed rate 63 at which the grease 54 at the back of the greasing device 20, when viewed in the longitudinal direction 1, begins to run down against the height direction 9 and form drops 67. From this point the lever 57 is slowly turned back towards the passage opening 25 to close the feed line 55 until the grease 54 on the back of the greasing device 20, when viewed in the longitudinal direction 1, stops running down against the height direction 9 and forms drops 67.

In this state, the car travels at a constant speed so that the grease 54 is applied constantly and with a constant coating thickness to the contact wire 14 in one application step 65. In FIG. 5 the diagram is shown interrupted at the point of application step 65.

The procedure is terminated in a final step 66 by fully closing lever 57. The car can also be stopped at this time.

The invention claimed is:

1. A method for greasing a contact wire for the electrical power supply of a pantograph of a rail vehicle comprising:
inserting the contact wire (14) into a passage opening (25) of a base body (21) that comprises a guide body part (22) and a cover part 23 extending in a longitudinal direction (1), a transverse direction (11) perpendicular to the longitudinal direction (1) and a height direction (9) perpendicular to the longitudinal direction (1) and perpendicular to the transverse direction (11), whereby the passage opening (25) penetrating the base body (21) in the longitudinal direction (1) as seen from a front side to a back side as seen in the longitudinal direction (1) and wherein the cover part (23) is placed on an upper side of the guide body part (22), seen in the height direction (9); a groove (24) extending in the longitudinal direction (1) is formed on an upper side of the guide body part (22) seen in the height direction (9) and is open in the longitudinal direction (1) at the face sides of the guide body part (22), so that a groove (24) is closed between the cover parts (23) and the guide body part (22), and forms the passage opening (25) through the base body (21), so that the contact wire (14) can be inserted into the groove (24), and
accelerating the base body (21) in the longitudinal direction (1) so that the contact wire (14) is moved through the passage direction, characterized by
introducing grease (54) into the passage opening (25) through which the contact wire (14) moves at a feed rate (59) at which the introduced grease (54) exits the passage opening (25) at the back of the base body (21) under a predetermined condition.

2. The method as claimed in claim 1, wherein the grease (54) exiting at the back of the base body (21) from the passage opening (25) is free of movement components at an angle to the longitudinal direction (1) under the predetermined condition (53).

3. The method as claimed in claim 1, wherein the feed rate (59) is increased as a function of the acceleration of the base body (1) in the longitudinal direction (1).

4. The method as claimed in claim 1, wherein before introducing grease into the passage opening (25), a tapered element narrowing the cross-section of the passage opening (25) is inserted into the passage opening (25) between a point of supply line (41) and the back of the base body (21).

5. The method as claimed in claim 1, wherein the grease (54) to be introduced into the passage opening (25) is passed through a fitting (56) actuated to reduce the feed rate (59).

6. A greasing device (20) to be used in a method as claimed in claim 4, comprising:

the base body (21) with the passage opening (25) through which the contact wire (14) can be pushed in the longitudinal direction, and the supply line (41) leading into the passage opening (25), and a fitting (56) for adjusting the feed rate (59) arranged in front of the supply line (41) when viewed from the passage opening (25).

7. The greasing device (20) according to claim 6, wherein the fitting (56) is a shut-off valve.

8. The greasing device (20) according to claim 7, wherein the shut-off valve (56) as valve key (57) comprises a lever of at least 5 cm which rotates about an axis of rotation.

9. The method as claimed in claim 2, wherein the feed rate (59) is increased as a function of the acceleration of the base body (1) in the longitudinal direction (1).

10. The method as claimed in claim 1, wherein a positioning projection (26) is formed on the cover part (23) in the area of each of face sides of the base body (21) in longitudinal direction (1), and the positioning projection (26) engages positively in the groove (24) when the cover part (23) is placed on the guide body part (22) in transverse direction (11).

11. The method as claimed in claim 10, wherein the cover part (23), which is placed on the guide body part (22), is then fastened to the guide body part (22) by three screw connections (27); one screw connection (27) is arranged on the back side of the base body (21) when viewed in the transverse direction (11), and two screw connections (27) are arranged on the front side.

12. The method as claimed in claim 11, wherein to pull the greasing device (20), a horizontal beam (33), known as a draw bar, is disposed on the front end of the base body (21) when viewed in the longitudinal direction (1), aligned in the transverse direction (11); at the ends of the horizontal beam (33) when viewed in the transverse direction (11), there are holding elements in the form of eye bolts (34) aligned in the longitudinal direction (1); the horizontal beam (33) and the eye bolts 34) together form a connecting element (35), via which the greasing device (20) can be connected to a pulling mechanism and pulled over the contact wire (14) in the longitudinal direction (1).

13. The method as claimed in claim 12, wherein on the horizontal beam (33, between the two eye bolts (34), two guide pulleys 36 are held rotatably about one rotation axis (37) each, which are aligned in the height direction (9); the guide pulleys (36) are arranged in transverse direction (11) at a roller distance (38) from each other; the guide pulleys (36), when viewed from an underside of the base body (21) seen in the height direction (9), are arranged at a not further referenced height, which is equal to a likewise not further referenced height of the passage opening (25), so that the contact wire (14) can be guided over the guide pulleys (36) in a predetermined rotational position about the longitudinal direction (1) into the passage opening (25); the guide pulleys (36) are each held on a swivel arm 39 so that the position of the guide pulleys (36) can be adapted to the transverse movements of the contact wire (14) in the transverse direction (11); and in order to keep the roller distance (38) constant, the swivel arms (39) are connected to each other via a coupling rod (40).

* * * * *